US011709972B2

(12) United States Patent
Ball et al.

(10) Patent No.: US 11,709,972 B2
(45) Date of Patent: Jul. 25, 2023

(54) SUBSTRATE FOR A TAMPER SENSOR

(71) Applicant: Measurement Specialties, Inc., Hampton, VA (US)

(72) Inventors: Anthony Ball, Virginia Beach, VA (US); Kenneth Jermstad, Hampton, VA (US); Michael Ritchie, Hampton, VA (US); Marcus Updyke, Portsmouth, VA (US)

(73) Assignee: TE CONNECTIVITY SOLUTIONS GMBH, Schaffhausen (CH)

(*) Notice: Subject to any disclaimer, the term of this patent is extended or adjusted under 35 U.S.C. 154(b) by 222 days.

(21) Appl. No.: 16/797,467

(22) Filed: Feb. 21, 2020

(65) Prior Publication Data

US 2021/0264067 A1 Aug. 26, 2021

(51) Int. Cl.
*G06F 21/86* (2013.01)
*H05K 1/02* (2006.01)

(52) U.S. Cl.
CPC ........... *G06F 21/86* (2013.01); *H05K 1/0275* (2013.01)

(58) Field of Classification Search
CPC ................ G06F 21/86; H05K 1/0275; H05K 2201/047; H05K 2201/0999; H05K 5/0208
See application file for complete search history.

(56) References Cited

U.S. PATENT DOCUMENTS

| 5,027,397 | A | * | 6/1991 | Double | H01L 23/576 |
| | | | | | 713/194 |
| 6,355,316 | B1 | * | 3/2002 | Miller | G06F 21/87 |
| | | | | | 428/13 |
| 6,982,642 | B1 | * | 1/2006 | Cesana | G06F 21/87 |
| | | | | | 340/550 |
| 2005/0225445 | A1 | * | 10/2005 | Petersen | B65D 5/42 |
| | | | | | 340/568.2 |
| 2007/0295810 | A1 | * | 12/2007 | Hopt | G06F 21/86 |
| | | | | | 235/441 |
| 2010/0102127 | A1 | | 4/2010 | Bonnet et al. | |
| 2013/0283386 | A1 | * | 10/2013 | Lee | G06F 21/86 |
| | | | | | 726/26 |
| 2015/0185864 | A1 | * | 7/2015 | Schulz | G06F 21/83 |
| | | | | | 341/22 |
| 2017/0156223 | A1 | | 6/2017 | Fisher et al. | |
| 2018/0082556 | A1 | * | 3/2018 | Dragone | G06F 21/87 |
| 2018/0235081 | A1 | | 8/2018 | Brodsky et al. | |

OTHER PUBLICATIONS

W. Wang, A. Sadeqi, H. R. Nejad and S. Sonkusale, "Cost-Effective Wireless Sensors for Detection of Package Opening and Tampering," in IEEE Access, vol. 8, p. 117122-117132, Jan. 2020 (Year: 2020).*
Extended European Search Report, European Application No. 21157597.2-1218, European Date, dated Jul. 1, 2021.

* cited by examiner

*Primary Examiner* — Daniel R Miller (57) ABSTRACT

A substrate for a tamper sensor includes a plurality of walls and a tab. The walls define a protective volume with an open side. The walls have a plurality of open edges adjacent the open side and a plurality of interior edges different from the open edges. The tab extends from one of the interior edges of one of the walls and is disposed within the protective volume.

17 Claims, 9 Drawing Sheets

SUBSTRATE FOR A TAMPER SENSOR

FIELD OF THE INVENTION

The present invention relates to a tamper sensor and, more particularly, to a substrate for a tamper sensor.

BACKGROUND

Tamper sensors are used to detect physical attacks on sensitive computing systems or other hardware storing sensitive data. Tamper sensors commonly have a structure defining a protective volume, in which hardware components of the computing systems or stored data are disposed, and a connection point disposed on the structure. The tamper sensor is coupled to the protected hardware components at the connection point. Through the connection, the tamper sensor can determine when an intruder has attempted to physically access or damage the computing system and/or stored data.

The connection point on many tamper sensors is on the structure of the tamper sensor in a position exposed to exterior access. The exterior exposure of the connection point can allow individuals attempting to obtain or destroy the sensitive data to manipulate the connection and bypass the tamper sensor, undermining the reliability of tamper detection.

SUMMARY

A substrate for a tamper sensor includes a plurality of walls and a tab. The walls define a protective volume with an open side. The walls have a plurality of open edges adjacent the open side and a plurality of interior edges different from the open edges. The tab extends from one of the interior edges of one of the walls and is disposed within the protective volume.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 1:
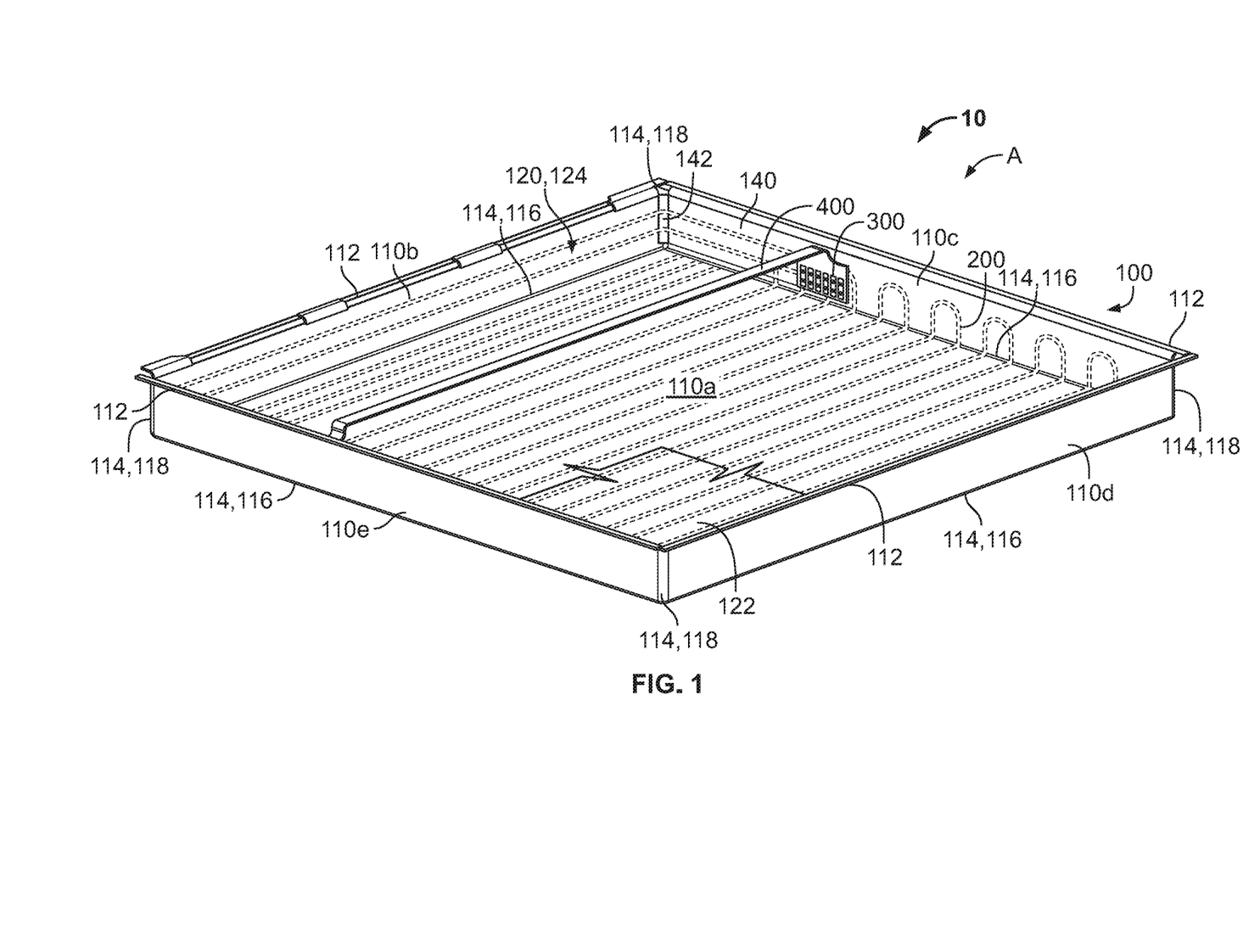
FIG. 1 is a perspective view of a tamper sensor according to an embodiment.

A tamper sensor 10 according to an embodiment, as shown in FIG. 1, comprises a substrate 100, a tamper circuitry 200 disposed within the substrate 100, and an interconnect 300 disposed on the substrate 100 and connected to the tamper circuitry 200.

Figure 2:
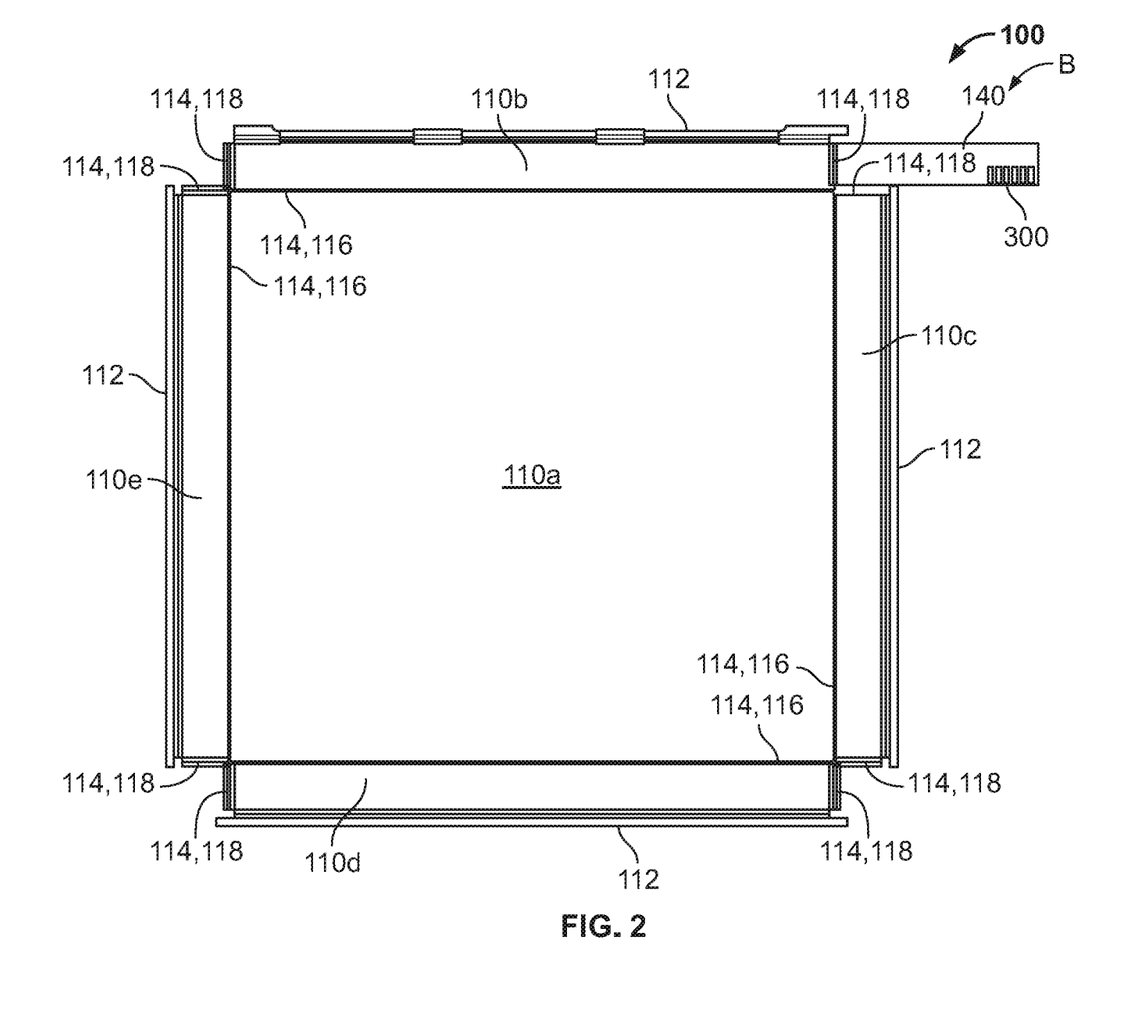
FIG. 2 is a plan view of a substrate of the tamper sensor in a flat state.

The substrate 100, as shown in FIGS. 1 and 2, includes a plurality of walls 110 and a tab 140 connected to at least one of the plurality of walls 110. In the shown embodiment, the substrate 100 is integrally formed in a single piece with the walls 110 and tab 140 and is formed of a flexible material. In an embodiment, the walls 110 and the tab 140 are formed of a polyvinylidene fluoride or a polyvinylidene difluoride (PVDF) film. The substrate 100 defines a protective volume 120 in a folded state A shown in FIG. 1.

As shown in FIG. 1, the tamper circuitry 200 is disposed within the substrate 100. The tamper circuitry 200 is a layer or a plurality of conductive layers, or another conductive material, disposed within the walls 110 and the tab 140. The tamper circuitry 200 includes electronic components adapted to detect tampering with a protected hardware disposed within the protective volume 120.

The interconnect 300, as shown in FIG. 1, is disposed on the tab 140 and electrically connected to the tamper circuitry 200. The interconnect 300 electrically connects a connection lead 400 connected to the protected hardware disposed within the protective volume 120 to the tamper circuitry 200 to allow the tamper circuitry 200 to detect tampering with the protected hardware. In the shown embodiment, the interconnect 300 has a plurality of connection points connected to the connection lead 400. In various embodiments, the interconnect 300 includes a via extending through the tab 140, a crimp disposed on the tab 140, a flex lead disposed on the tab 140, a wire disposed on the tab 140, or any other type of connection between the tamper circuitry 200 within the substrate 100 and the connection lead 400.

The substrate 100 is foldable between a flat state B, shown in FIG. 2, and the folded state A, shown in FIG. 1. In the folded state A, the protective volume 120 has an open side 122. The open side 122 is schematically shown in a corner of the protective volume 120 in FIG. 1 for ease of comprehension but extends fully across a side of the substrate 100 in the folded state A.

In the embodiment shown in FIGS. 1 and 2, the protective volume 120 has a cubic shape 124 and the plurality of walls 110 include a base wall 110a, a first wall 110b, a second wall 110c, a third wall 110d, and a fourth wall 110e. The base wall 110a forms a base of the substrate 100 opposite the open side 122 and the walls 110b-e extend vertically from the base wall 110a to define the protective volume 120. In the shown embodiment, the base wall 110a is square and is larger than the walls 110b-e, which each have an approximately same size and a rectangular shape. In other embodiments, as described in greater detail below, the walls 110 could each be the same size, the walls 110 could have different shapes, and the number of walls 110 can vary from the five walls 110a-e shown in FIGS. 1 and 2.

As shown in FIGS. 1 and 2, the walls 110 collectively have a plurality of open edges 112 and a plurality of interior edges 114. The open edges 112 are each adjacent the open side 122 in the folded state A. In the embodiment shown in FIGS. 1 and 2, each of the walls 110b-e has one open edge 112. The interior edges 114 are different from the open edges 112 and include a plurality of connected edges 116 and a plurality of joint edges 118. The walls 110 are connected to one another in the flat state B by the connected edges 116. The joint edges 118 are different from the open edges 112 and the connected edges 116.

The walls 110 are folded or bent with respect to one another along the connected edges 116 from the flat state B to the folded state A to define the protective volume 120, as shown in FIGS. 1 and 2. In the embodiment shown in FIGS. 1 and 2, the base wall 110a has four connected edges 116 each shared with one of the walls 110b-e. The walls 110b-e are each bent perpendicularly with respect to the base wall 110a along the connected edges 116 in the embodiment shown in FIGS. 1 and 2. The joint edges 118 of the walls 110b-e abut one another in the folded state A.

The tab 140, as shown in FIGS. 1 and 2, extends from one of the interior edges 114 of one of the walls 110. In the shown embodiment, the tab 140 extends from the joint edge 118 of the first wall 110b. In other embodiments, the tab 140 could alternatively extend from any of the joint edges 118 of the walls 110b-e.

From the flat state B to the folded state A, in the embodiment shown in FIGS. 1 and 2, the tab 140 is bent or folded along a single bend 142 at a position where the tab 140 is connected to the first wall 110b. The tab 140 is bent through no more than the single bend 142 with respect to the first wall 110b. In the shown embodiment, the single bend 142 is a 90° bend; the tab 140 extends perpendicularly with respect to the first wall 110b.

As shown in FIG. 1, the tab 140 bent along the single bend 142 is disposed within the protective volume 120 in the folded state A. The tab 140 extends along an interior side of the second wall 110c facing the protective volume 120. The second wall 110c is positioned between the tab 140, and the interconnect 300 disposed on the tab 140, and an area exterior of the protective volume 120 and exterior of the substrate 100. The second wall 110c covers the tab 140 and the interconnect 300 and limits exterior access to the tab 140 and the interconnect 300.

A substrate 100 according to a number of other embodiments is shown in FIGS. 3A-3H in the flat state B. The substrate 100 in each of the embodiments shown in FIGS. 3A-3H folds from the flat state B into the folded state A as described above to define a protective volume 120 with a cubic shape 124. In each of the embodiments shown in FIGS. 3A-3H, the walls 110 are a polyform; a series of polygons joined together and each having an identical shape. In the shown embodiments, each of the walls 110 has a square shape. The walls 110 can be joined together to form a variety of polyform shapes, including a cross shape shown in FIG. 3A, a large L-shape in FIG. 3B, a T-shape in FIG. 3C, an M-shape in FIG. 3D, a large Z-shape in FIG. 3E, a small Z-shape in FIG. 3F, a Y-shape in FIG. 3G, and a small L-shape in FIG. 3H.

In each of the embodiments shown in FIGS. 3A-3H, the edges 112, 114, 116, 118 and the base wall 110a are labeled as described above to indicate the folding of the substrate 100. Some of the reference numbers are omitted in some of FIGS. 3A-3H for clarity of the drawings, but the shown elements are clearly understood based on the labeling and description with reference to the embodiments of FIGS. 1-3A.

Figure 3A:
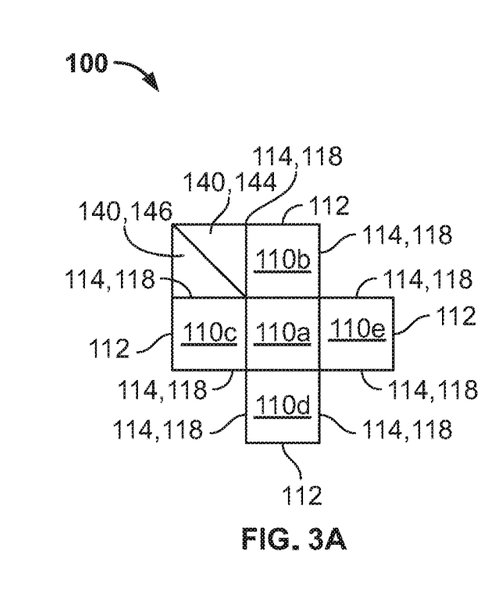
FIG. 3A is a plan view of a substrate of the tamper sensor in a flat state with a cross shape according to another embodiment.
Figure 3B:
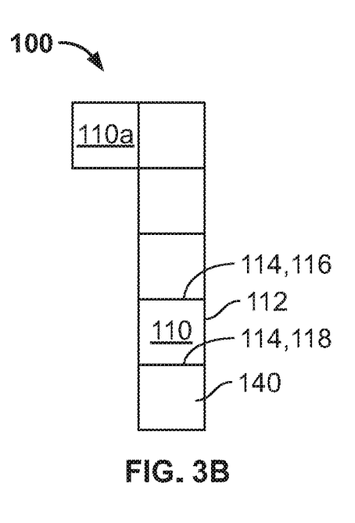
FIG. 3B is a plan view of a substrate of the tamper sensor in a flat state with a large L-shape according to another embodiment.
Figure 3C:
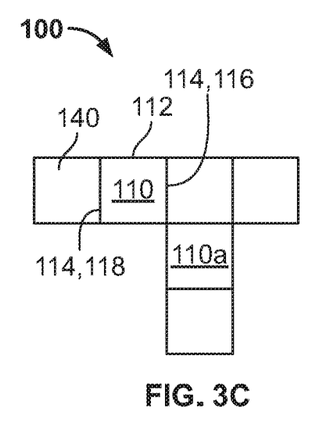
FIG. 3C is a plan view of a substrate of the tamper sensor in a flat state with a T-shape according to another embodiment.
Figure 3D:
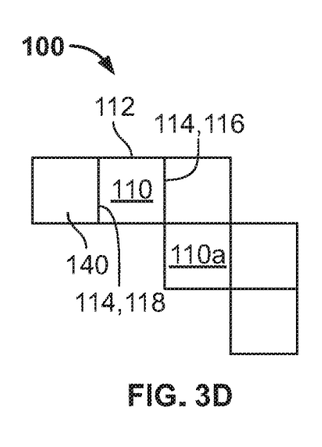
FIG. 3D is a plan view of a substrate of the tamper sensor in a flat state with an M-shape according to another embodiment.
Figure 3E:
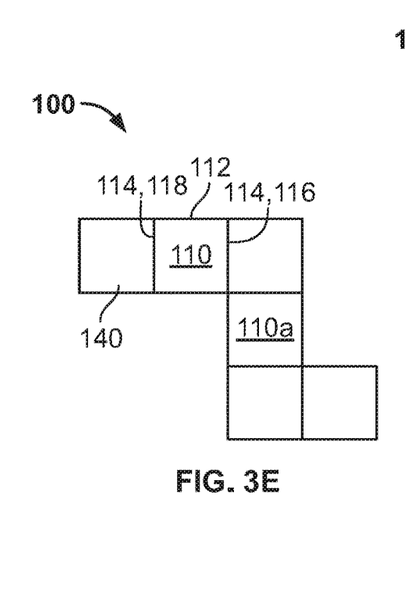
FIG. 3E is a plan view of a substrate of the tamper sensor in a flat state with a large Z-shape according to another embodiment.
Figure 3F:
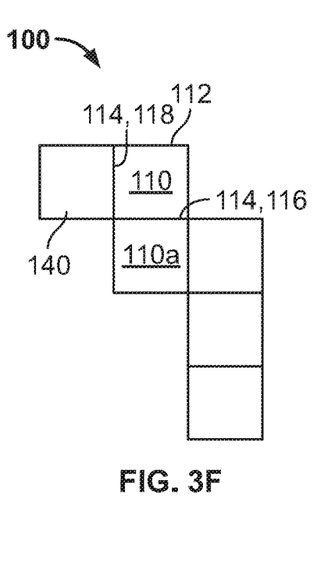
FIG. 3F is a plan view of a substrate of the tamper sensor in a flat state with a small Z-shape according to another embodiment.
Figure 3G:
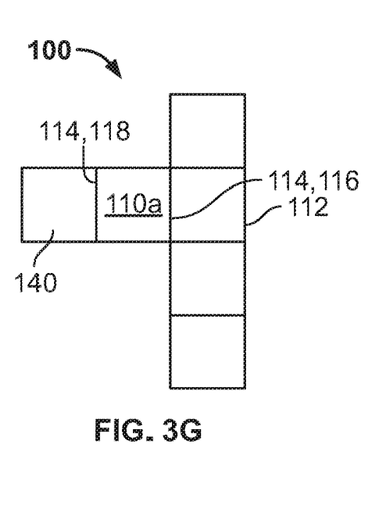
FIG. 3G is a plan view of a substrate of the tamper sensor in a flat state with a Y-shape according to another embodiment.
Figure 3H:
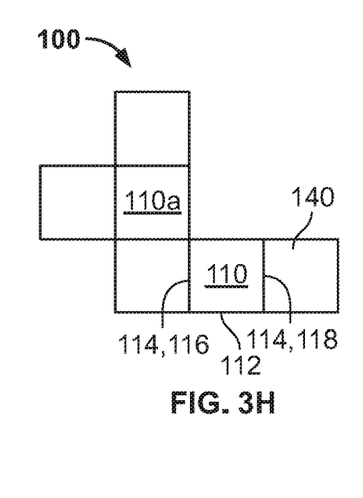
FIG. 3H is a plan view of a substrate of the tamper sensor in a flat state with a small L-shape according to another embodiment.

As shown in FIGS. 3B-3H, the tab 140 extends from the joint edge 118 of one of the walls 110. The tab 140 can extend from the joint edge 118 of the base wall 110a or from any of the other walls 110. As shown in the embodiment of FIG. 3A, the tab 140 can alternatively have at least a first portion 144 and a second portion 146 separate from one another, with the first portion 144 extending from the joint edge 118 of the first wall 110b and the second portion 146 extending from the joint edge 118 of the second wall 110c. Each of the first portion 144 and the second portion 146 has the interconnect 300.

In each of the embodiments of FIGS. 3A-3H, the folding of the substrate 100 along the connected edges 116 and the folding of the tab 140 to the single bend 142 from the joint edge 118, or the folding of each of the portions 144, 146 of the tab 140 to the single bend 142 from the respective joint edges 118, positions the tab 140 within the protective volume 120. In other embodiments, the tab 140 could extend from the joint edges 118 of other walls 110 of the substrates 100 shown in FIGS. 3A-3H or the polyforms of the walls 110 could have other shapes while still positioning the tab 140 within the protective volume 120 in the folded state A.

Figure 4A:
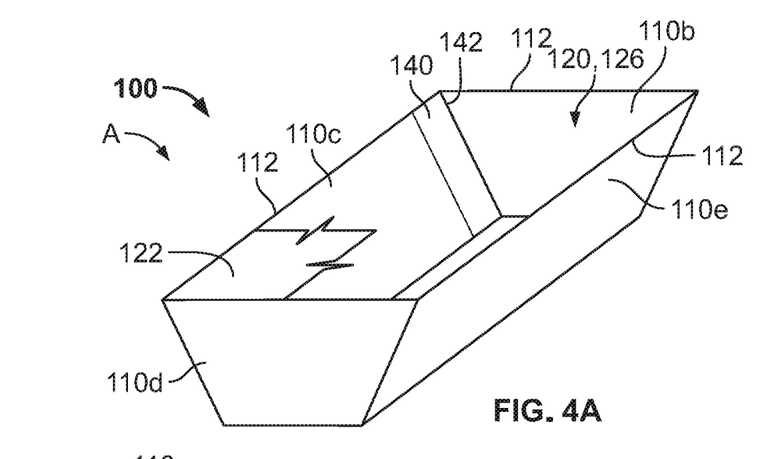
FIG. 4A is a perspective view of a substrate of the tamper sensor in a folded state with a rectangular prism shape according to another embodiment.
Figure 4B:
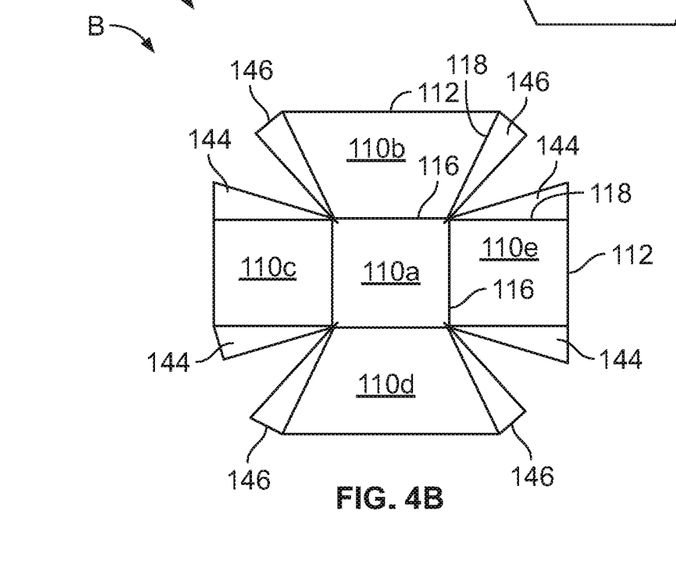
FIG. 4B is a plan view of a substrate of the tamper sensor in a flat state with a rectangular prism shape according to another embodiment.
Figure 4C:
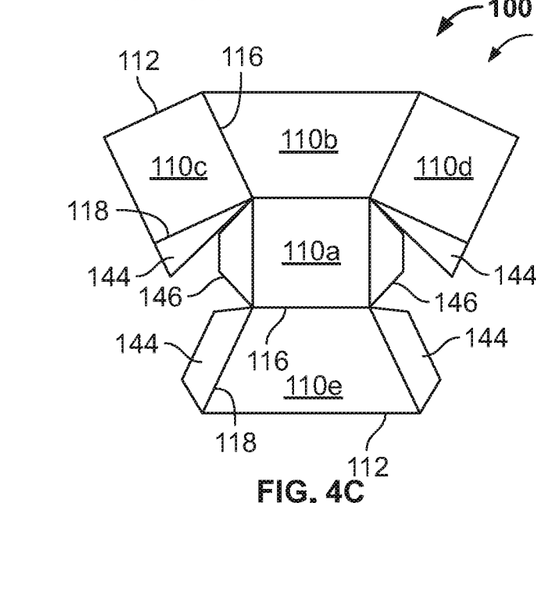
FIG. 4C is a plan view of a substrate of the tamper sensor in a flat state with a rectangular prism shape according to another embodiment.

The substrate 100 can also form the protective volume 120 in a rectangular prism shape 126 in the folded state A, as shown in FIG. 4A. The walls 110 have different shapes necessary to form the rectangular prism shape 126, and can have different arrangements of connected edges 116 and joint edges 118 in the flat state B shown in the embodiments of FIGS. 4B and 4C to form the rectangular prism shape 126. In the embodiments shown in FIGS. 4B-4C, the tab 140 has portions 144, 146 extending from joint edges 118 of the walls 110; in other embodiments, such as the embodiment shown in FIG. 4A, the tab 140 may only extend from the joint edge 118 of one of the walls 110. In all embodiments with the rectangular prism shape 126, the tab 140 or tab portions 144, 146 extend from joint edges 118 of the walls 110 and are positioned within the protective volume 120 in the folded state A.

Figure 5A:
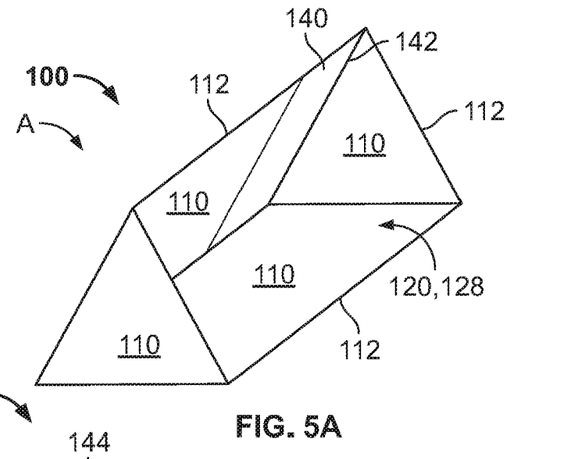
FIG. 5A is a perspective view of a substrate of the tamper sensor in a folded state with a triangular prism shape according to another embodiment.
Figure 5B:
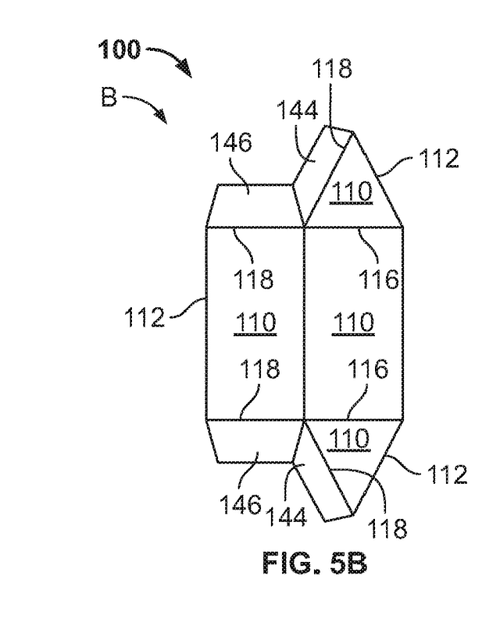
FIG. 5B is a plan view of a substrate of the tamper sensor in a flat state with a triangular prism shape having an open side according to another embodiment.
Figure 5C:
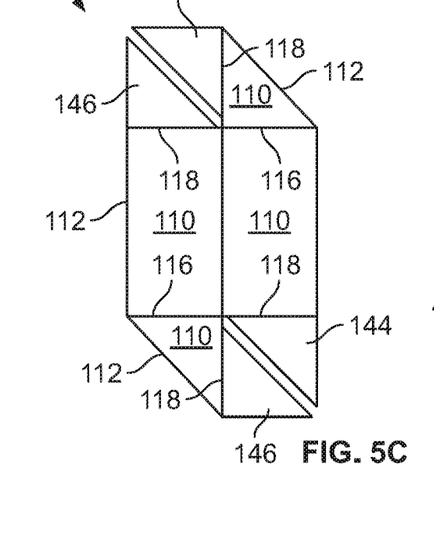
FIG. 5C is a plan view of a substrate of the tamper sensor in a flat state with a triangular prism shape having an open side according to another embodiment.
Figure 5D:
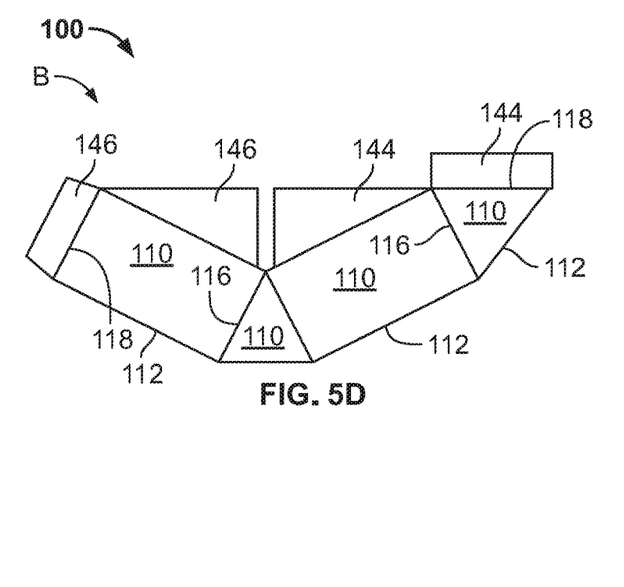
FIG. 5D is a plan view of a substrate of the tamper sensor in a flat state with a triangular prism shape having an open side according to another embodiment.
Figure 5E:
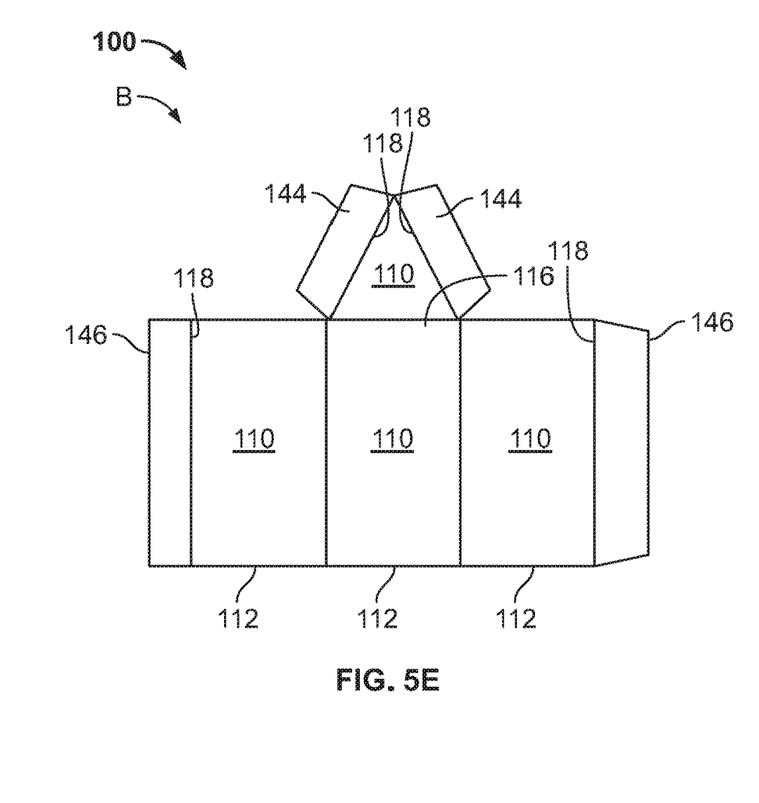
FIG. 5E is a plan view of a substrate of the tamper sensor in a flat state with a triangular prism shape having closed sides according to another embodiment.
Figure 5F:
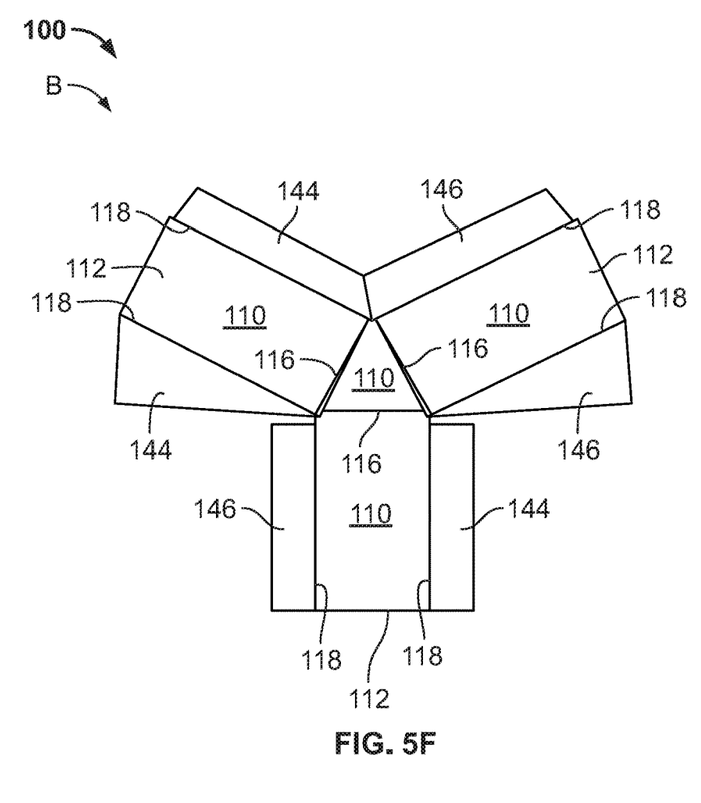
FIG. 5F is a plan view of a substrate of the tamper sensor in a flat state with a triangular prism shape having closed sides according to another embodiment.

The substrate 100 can also form the protective volume 120 in a triangular prism shape 128 in the folded state A, as shown in FIG. 5A. In an embodiment in which the triangular prism shape 128 has an open side, as shown in FIGS. 5B-5D, the flat state B of the substrate 100 forming the triangular prism shape 128 can have the walls 110 and tab portions 144, 146 in different shapes and arrangements while still having the tab 140 or tab portions 144, 146 extending from the joint edges 118 of the walls 110 and positioned within the protective volume 120 in the folded state A. In an embodiment in which the triangular prism shape 128 has closed sides, as shown in FIGS. 5E and 5F, the flat state B of the substrate 100 forming the triangular prism shape 128 can likewise have the walls 110 and tab portions 144, 146 in different shapes and arrangements while still having the tab 140 or tab portions 144, 146 extending from the joint edges 118 of the walls 110 and positioned within the protective volume 120 in the folded state A.

Figure 6A:
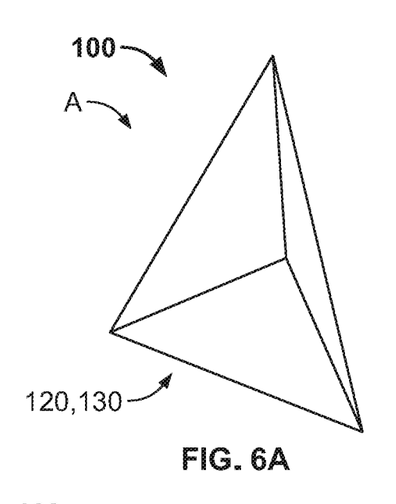
FIG. 6A is a perspective view of a substrate of the tamper sensor in a folded state with a pyramid shape according to another embodiment.
Figure 6B:
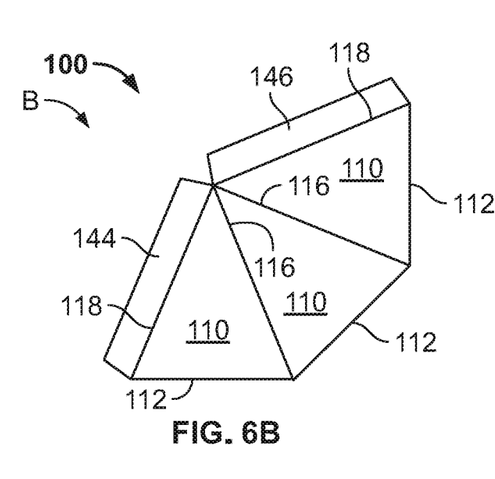
FIG. 6B is a plan view of a substrate of the tamper sensor in a flat state with a pyramid shape according to another embodiment.
Figure 6C:
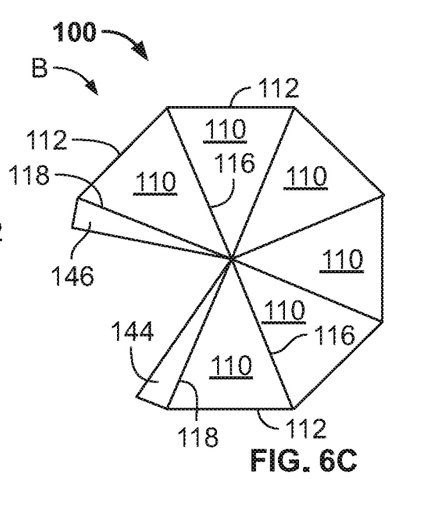
FIG. 6C is a plan view of a substrate of the tamper sensor in a flat state with a pyramid shape according to another embodiment.
Figure 6D:
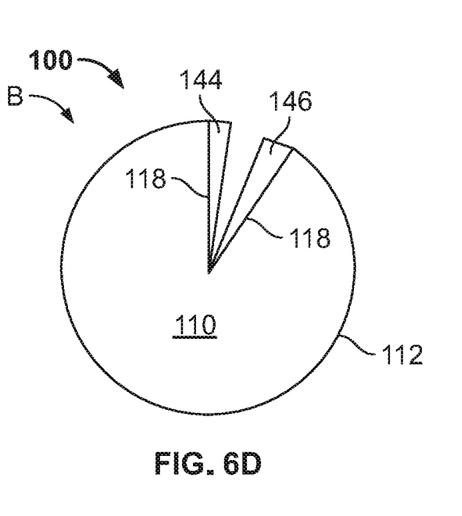
FIG. 6D is a plan view of a substrate of the tamper sensor in a flat state with a cone shape according to another embodiment.

In another embodiment shown in FIG. 6A, the substrate 100 can form the protective volume 120 in a pyramid shape 130. As shown in FIGS. 6B and 6C, in the flat state B, the walls 110 and tab portions 144, 146 can have different numbers, shapes, and arrangements while still having the tab 140 or tab portions 144, 146 extending from the joint edges 118 of the walls 110 and positioned within the pyramid shape 130 of the protective volume 120 in the folded state A. In another embodiment shown in FIG. 6D, the substrate 100 can have a single wall 110 formed in a curved shape with the tab portions 144, 146 or tab 140 extending from the joint edges 118, forming a cone shape as the protective volume 120.

Figure 7A:
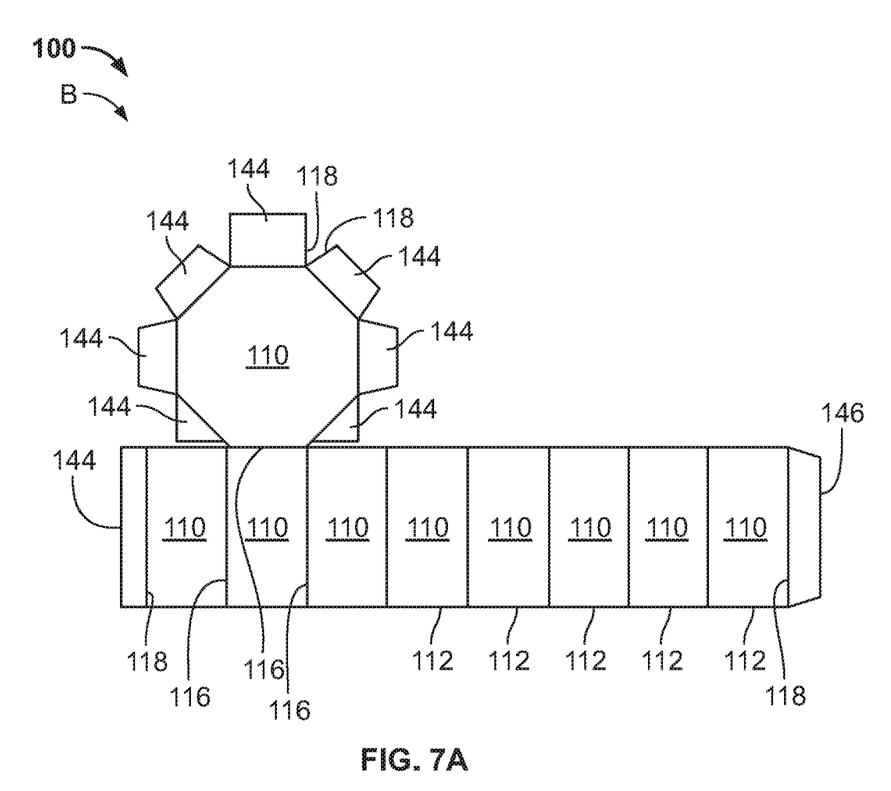
FIG. 7A is a plan view of a substrate of the tamper sensor in a flat state with a cylindrical shape according to another embodiment.
Figure 7B:
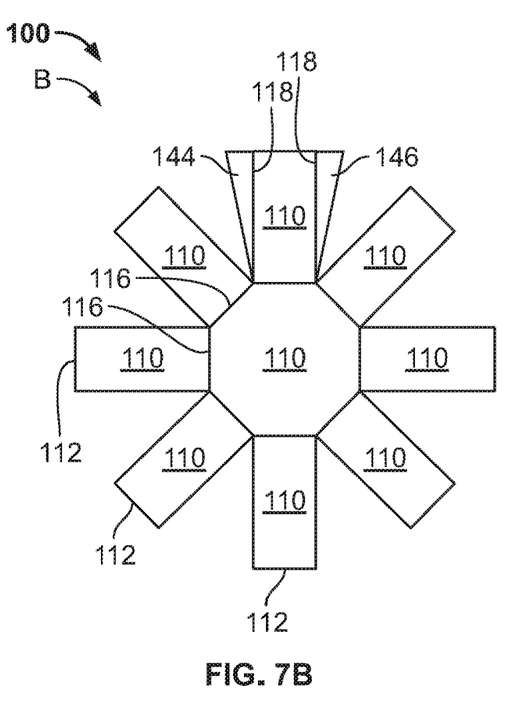
FIG. 7B is a plan view of a substrate of the tamper sensor in a flat state with a cylindrical shape according to another embodiment.

In another embodiment shown in FIGS. 7A and 7B, the substrate 100, shown in the flat state B, can form the protective volume 120 in a cylindrical shape. As shown in FIGS. 7A and 7B, in the flat state B, the walls 110 and tab portions 144, 146 can have different numbers, shapes, and arrangements while still having the tab 140 or tab portions 144, 146 extending from the joint edges 118 of the walls 110 and would be positioned within the cylindrical shape of the protective volume 120.

What is claimed is:

1. A substrate for a tamper sensor, comprising:
a plurality of walls defining a protective volume with an open side in a folded state, the walls having a plurality of open edges adjacent the open side and a plurality of interior edges different from the open edges;
a tab extending from one of the interior edges of one of the walls, the tab disposed within the protective volume; and
a tamper circuitry disposed within the walls and the tab, the tab has an interconnect comprising a plurality of connection points exposed to an interior space of the protective volume on an outer surface of the tab and via which the tamper circuitry is electrically connected to a connection lead formed separately from the substrate.

2. The substrate of claim 1, wherein the walls are foldable with respect to each other between a flat state and the folded state in which the walls define the protective volume.

3. The substrate of claim 2, wherein the tab is foldable with respect to the one of the walls between the flat state and the folded state in which the tab is disposed within the protective volume.

4. The substrate of claim 3, wherein the tab extends perpendicular with respect to the one of the walls in the folded state.

5. The substrate of claim 2, wherein the interior edges of the walls include a plurality of connected edges at which the walls are connected to one another in the flat state, the walls are foldable along the connected edges.

6. The substrate of claim 5, wherein the interior edges of the walls include a plurality of joint edges different from the connected edges, the joint edges abut one another in the folded state.

7. The substrate of claim 6, wherein the tab extends from one of the joint edges of one of the walls.

8. The substrate of claim 1, wherein the protective volume has a cubic shape, a rectangular prism shape, a triangular prism shape, a pyramid shape, a cone shape, or a cylindrical shape.

9. The substrate of claim 2, wherein the walls are a polyform in the flat state.

10. The substrate of claim 9, wherein the walls form a large L-shape, a T-shape, an M-shape, a large Z-shape, a small Z-shape, a Y-shape, or a small L-shape in the flat state.

11. The substrate of claim 1, wherein the interconnect is a via extending through the tab, a crimp disposed on the tab, a flex lead disposed on the tab, or a wire disposed on the tab.

12. The substrate of claim 1, wherein the walls and the tab are integrally formed in a single piece.

13. The substrate of claim 12, wherein the walls and the tab are a polyvinylidene fluoride or a polyvinylidene difluoride (PVDF) film.

14. The substrate of claim 1, wherein the tab has a first portion extending from one of the interior edges of a first wall of the walls and a second portion extending from one of the interior edges of a second wall of the walls.

15. A substrate for a tamper sensor, comprising:
a plurality of walls foldable with respect to each other between a flat state and a folded state in which the walls define a protective volume;
a tab extending from a first wall of the plurality of walls, through no more than a single bend, and along an interior side of a second wall of the plurality of walls within the protective volume; and a tamper circuitry disposed within the walls and the tab, the tab has an interconnect comprising a plurality of connection points exposed to an interior space of the protective volume on an outer surface of the tab and via which the tamper circuitry is electrically connected to a connection lead formed separately from the substrate.

16. The substrate of claim 15, wherein the tab extends perpendicular to the first wall.

17. A tamper sensor, comprising:
a substrate including a plurality of walls defining a protective volume with an open side, the walls having a plurality of open edges adjacent the open side and a plurality of interior edges different from the open edges, and a tab extending from one of the interior edges of one of the walls, the tab disposed within the protective volume;
a tamper circuitry disposed within the walls and the tab;
a connection lead formed separately from the substrate; and
an interconnect comprising a plurality of connection points exposed to an interior space of the protective volume on an outer surface of the tab and via which the tamper circuitry is electrically connected to the connection lead.

* * * * *